United States Patent [19]

Gentner et al.

[11] Patent Number: 4,893,162

[45] Date of Patent: Jan. 9, 1990

[54] INTEGRATED SEMICONDUCTOR ARRANGEMENT OF THE COUPLING TYPE BETWEEN A PHOTODETECTOR AND A LIGHT WAVEGUIDE

[75] Inventors: Jean-Louis Gentner, Saint-Maur; Marko Erman, Paris, both of France

[73] Assignee: U.S. Philips Corp., New York, N.Y.

[21] Appl. No.: 81,212

[22] Filed: Jun. 29, 1987

[30] Foreign Application Priority Data

Jul. 9, 1986 [FR] France .................................. 86 09984

[51] Int. Cl.$^4$ .............................................. H01L 27/14
[52] U.S. Cl. ........................................ 357/30; 357/19; 357/16; 333/248
[58] Field of Search ................. 357/30 L, 30 M, 30 G, 357/19, 16, 30 E; 333/248

[56] References Cited

U.S. PATENT DOCUMENTS

| | | | |
|---|---|---|---|
| 4,152,044 | 5/1979 | Liu ..................................... | 357/19 X |
| 4,730,330 | 3/1988 | Plihal et al. ........................ | 357/19 X |
| 4,747,649 | 5/1988 | Heinen et al. ..................... | 350/96.12 |
| 4,751,555 | 6/1988 | Alferness et al. ................. | 357/16 |

FOREIGN PATENT DOCUMENTS

| | | |
|---|---|---|
| 0187979 | 7/1986 | European Pat. Off. . |
| 59-25282 | 2/1984 | Japan ..................... 357/19 |
| 59-75658 | 4/1984 | Japan ..................... 357/19 |
| 60-79781 | 5/1985 | Japan ..................... 357/30 E |
| 0365953 | 6/1977 | U.S.S.R. ................ 333/248 |

OTHER PUBLICATIONS

R. Tommer, "Monolithic InGaAs Photodiode Array . . .", Electronics Letters, vol. 21, No. 9, pp. 382–383, Apr. 25, 1985.

J. Brandon et al., "Double Heterostructure GaAs–Al$_x$Ga1–xAs Rib Waveguide . . . ", Second European Conference on Integrated Optics, Oct. 1983.

Primary Examiner—William A. Mintel
Attorney, Agent, or Firm—William L. Botjer

[57] ABSTRACT

An integrated semiconductor arrangement of the coupling type between a photodetector D and a light wave guide $G_1$, operating in a band of given wavelengths, containing on the surface of a semiconductor substrate S of a III-V compound one after the other a confining layer $C_0$ of III-V compound and a transparent layer $C_1$ of a III-V compound for the operating wavelengths having an index superior to that of the confining layer, the light waveguide $G_1$ being realized in layer $C_1$, and also containing an absorbing layer $C_3$ of a III-V compound for the operating wavelengths having an index superior to that of the waveguide, in which layer $C_3$ the photodetector is realized, characterized in that the absorbing layer $C_3$ is deposited on top of the transparent layer $C_1$ such that the photodetector is formed on the surface of the light wave guide $G_1$ and coupled to the latter in parallel with its axis over a given coupling length $L_2$ of which is a function the amount of light issued by the guide and received by the photodetector. This arrangement can also include, deposited between the transparent layer $C_1$, hereinafter called first transparent layer and the absorbing layer $C_3$, a second transparent layer $C_2$ of a III-V compound for the operating wavelengths having an index lying between that of the first transparent layer $C_1$ and that of the absorbing layer $C_3$.

11 Claims, 7 Drawing Sheets

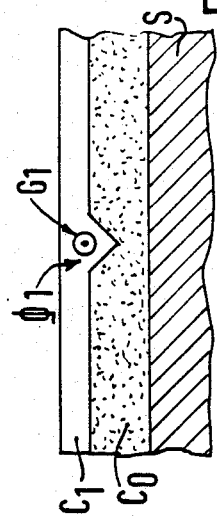
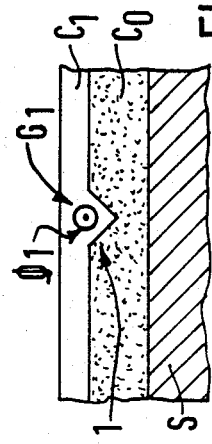
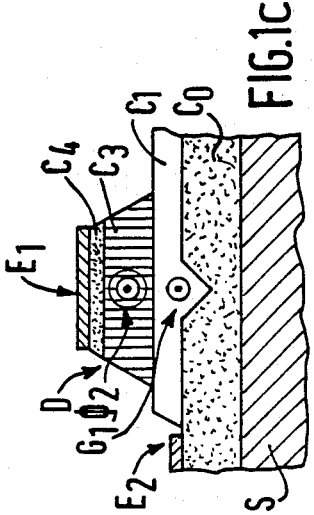
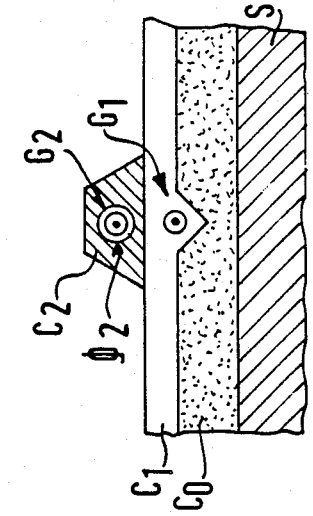
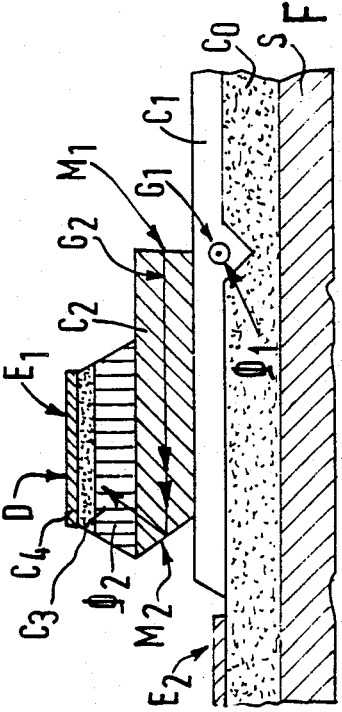

4,893,162

INTEGRATED SEMICONDUCTOR ARRANGEMENT OF THE COUPLING TYPE BETWEEN A PHOTODETECTOR AND A LIGHT WAVEGUIDE

BACKGROUND OF THE INVENTION

The invention relates to an integrated semiconductor arrangement of the type for coupling between a photodetector D and a light wave guide $G_1$, operating within a band of given wavelengths containing on the surface of a semiconductor substrate S of a III-V compound a confining layer $C_0$ of a III-V compound and a transparent layer $C_1$ of a III-V compound, transparent layer $C_1$ being transparent for the operating wavelengths, and having an index superior to that of the confining layer, the light wave guide $G_1$ being realized in layer $C_1$, and also containing an absorbing layer $C_3$ of a III-V compound for the operating wavelengths having an index superior to that of the waveguide, in which layer $C_3$ the photodetector is realized.

The arrangement in accordance with the invention can be applied for detecting the output signal on one of the channels of an interferometer of the Mach-Zehnder type, for example, or on the output channels of an optical switching matrix, for controlling a negative feedback of the adjustment of the electrode voltage with a view to, for example, compensating for the undesired drift. This arrangement can also be used, for example, for fabricating bistable optical arrangements.

Such a coupling arrangement is known from the prior art from the publication by R. TROMMER in "Electronics Letters 25th Apr. 1985, Vol. 21, No. 9", entitled "Monolithic InGaAs Photodiode Array illuminated through an integrated waveguide". This document describes an array fabricated on top of a sulphur doped 100-oriented indium phosphide (InP) substrate, of the n+ type and having a thickness of 220 $\mu$m, on one surface of which is fabricated an integrated waveguide and on the other surface of which is fabricated an indium gallium arsenide (InGaAs) PIN photodiode. The arrangement is fabricated in two steps. The first step comprises the fabrication of the photodiode through the liquid-phase epitaxy growth process of an undoped indium gallium arsenide (InGaAs) layer of the n type, having a thickness of 3 $\mu$m, serving as an active layer, then two thin quaternary InGaAsP buffer layers, followed by an indium phosphide (InP) cap layer. The indium phosphide cap layer is intended to protect the arrangement during the second epitaxial step. During this second epitaxial step the waveguide is deposited on the opposite surface of the substrate by means of three layers, first indium phosphide (InP), secondly InGaAsP ($\lambda g=1.036$ $\mu$m) and thirdly indium phosphide (InP). The light is guided into the photodiode passing through the whole substrate. For this purpose a facet is formed across the layers forming the guide, underneath the photodiode, by means of anisotropic etching of these layers. The fabrication of the photodiode which is of the PLANAR type further comprises the zinc atom (Zn) diffusion with a 100 $\mu$m diameter in the indium gallium arsenide (InGaAs) layer, the external surface passivation by a plasma deposited $Si_3N_4$ layer, and the fabrication of the p and n contacts by means of titanium and gold (Ti—Au) metallisation.

The arrangement described in the said document has various disadvantages as to the application considered for detecting the presence of the signal:

in the first place, the detector formed by the photodiode is fabricated on a surface differing from the substrate surface on which the waveguide is fabricated. This is disadvantageous as to the positioning of the substrate in, for example, a casino, or any other supporting element of the substrate;

secondly, the fact that the light beam has to pass through the substrate does not allow the use of very thick standard, semi-isolating substrates of the order of 330 $\mu$m;

thirdly, the light reflected by the slab is no longer guided. This arrangement gives rise to losses incrementing with the thickness of the substrate;

in the fourth place, the fact that in the known arrangement the reflected light is not guided does now allow a plurality of arrangements to be positioned next to each other. Actually, in these conditions each arrangement would receive part of the signal meant for the adjacent arrangements. Thus, the known arrangement cannot be used, for example, for detecting the signals at the output of a demultiplixing system, which output is formed by a plurality of light waveguides conveying signals of different wavelengths, because the use of this arrangement would cause undesired multiplexing of these signals;

in the fifth place, the whole signal conveyed by the light wave guide must be transmitted to the detector. This prevents this signal from being used outside this detecting operation, as the known arrangement has only one channel. Consequently, this arrangement is unsuitable for the detection of the simple presence of a signal, for example, as this detection has to be carried out without taking off the whole signal, as the latter is meant for another operation.

It is an object of the invention to provide an arrangement with which these disadvantages can be eliminated.

SUMMARY OF THE INVENTION

According to the invention this object is achieved by means of an arrangement described in the preamble, characterized in that the absorbing layer $C_3$ is deposited on top of the transparent layer $C_1$ such that the photodetector is formed on the surface of the light wave guide $G_1$ and coupled to the latter in parallel with its axis over a given coupling length $L_2$ of which is a function the amount of light issued by the guide and received by the photodetector.

In a variant of the invention, this arrangement is characterized in that it comprises, deposited between the transparent layer $C_1$ hereinafter called first transparent layer and the absorbing layer $C_3$, a second transparent layer $C_2$ of a III-V compound for the operating wavelengths having an index lying between that of the first transparent layer $C_1$ and that of the absorbing layer $C_3$, in which second transparent layer $C_2$ a second light waveguide $G_2$, referred to as intermediate guide is realized, formed on the surface of the guide desposited in the first transparent layer $C_1$, hereinafter called main guide $G_1$, and coupled to the latter inparallel with its axis over a coupling length $L_1$, of which is a function the amount of light issued by the main guide $G_1$ and received by the intermediate guide $G_2$.

The arrangement in accordance with the invention has among others the following advantages:

the guide(s) is (are) deposited on the same substrate surface as the photodetector, which facilitates the encapsulation and also the synergic fabrication with other associated semiconductor arrangements. Furthermore, the substrate can have a standard thickness;

the light is always guided, which allows the deposition of arrangements in accordance with the invention on the surface of adjacent light waveguides without there being a fear of undesired multiplexing;

the amount of light taken off by the photodetector is a function of the coupling length, hence this amount of light may be sufficiently small not to disturb the operation of an arrangement processing the signal carried by the light waveguide;

the amount of light taken off by the photodetector produces sufficient information for providing, for example, negative feedback for adjusting polarizing electrodes positioned on the light waveguide;

the arrangement in accordance with the invention can be used if desired as a commutation system.

BRIEF DESCRIPTION OF THE DRAWINGS

For a better understanding the invention will be further explained by means of the appended Figures in which:

FIG. 1b shows in a diagram a cross-section of this arrangement along axis II' of FIG. 1a;

FIG. 1c shows in a diagram a cross-section of this arrangement along axis JJ' of FIG. 1a;

FIG. 1d shows in a diagram a cross-section of this arrangement along axis KK' of FIG. 1a;

FIG. 2b shows in a diagram a cross-section of this arrangement along axis II' of FIG. 2a;

FIG. 2c shows in a diagram a cross-section of this arrangement along axis JJ' of FIG. 2a;

FIG. 2d shows in a diagram a cross-section of this arrangement along axis KK' of FIG. 2a;

DETAILED DESCRIPTION OF THE PREFERRED EMBODIMENTS

Figure 1A:
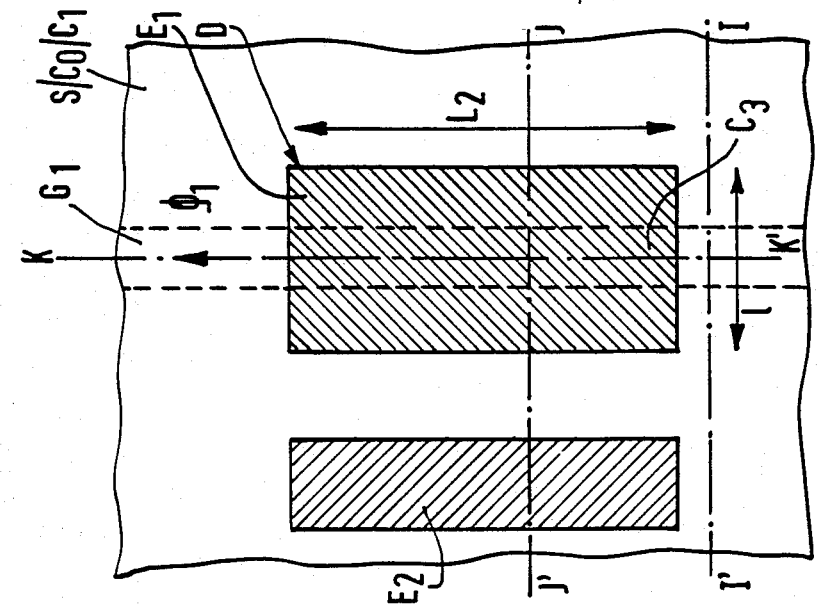
FIG. 1a shows in a diagram an embodiment in accordance with the invention coupled directly to a light waveguide as viewed from above.

As schematically shown in FIG. 1a, viewed from above, the coupling arrangement according to the invention is connected on the one hand to a light waveguide $G_1$ and on the other to a photodetector D.

FIG. 1b is a cross-section along axis I-I' of the arrangement shown in FIG. 1a. As schematically shown in FIG. 1b, this arrangement first contains a confining layer $C_0$ deposited on one of the surfaces of a semiconductor substrates of a group III-V compound and having a compatible crystalline mesh and a refraction index of $n_0$.

On top of this confining layer $C_0$ a layer $C_1$ is deposited of a group III-V semiconductor compound having a crystalline mesh compatible with the preceding layers and a refraction index of:

$$n_1 > n_0$$

In this layer $C_1$ having an index of $n_1$, a strip is formed constituting a light waveguide, for example, by means of a deposition process described hereinafter. For this purpose the material forming the $C_1$ layer is selected from the transparent compounds on a band of wavelengths chosen, for example for the wavelengths used in telecommunication which are:

$$\lambda_1 \simeq 1.3 \ \mu m$$

or $\lambda_2 \simeq 1.55 \ \mu m$.

FIG. 1c is a cross-section along the J-J' axis of the arrangement shown in FIG. 1a. As schematically shown in FIG. 1c this arrangement contains a layer $C_3$ of a group III-V semiconductor compound deposited on top of layer $C_1$ and having a crystalline mesh compatible with the preceding layers and a refraction index of:

$$n_3 > n_1 > n_0.$$

In this cap layer $C_3$ a photodetector D is formed, for example, by means of the deposition process described hereinafter. To this effect the material forming the $C_3$ layer is furthermore selected from the absorbing compounds in the range of the selected operating wavelengths.

The photodetector deposited in layer $C_3$ is deposited on the surface of waveguide $G_1$ and coupled thereto in parallel with its axis over a coupling length of $L_2$.

Allowing for the different indices of the materials included in this arrangement, a signal $\phi_1$ injected into the light conductor $G_1$ will enter the absorbing medium $C_3$ for a portion $\phi_2$ which is a function of the coupling length $L_2$ and the indices. Thus, according to the coupling length chosen for the materials having the given indices, the percentage $\phi_2$ of the signal received by the photodetector D may vary from four to practically a hundred.

FIG. 1d is a cross-section along axis K-K' of the arrangement of FIG. 1a. Furthermore, the photodetector comprises a layer $C_4$ for forming for example a p-n junction together with layer $C_3$, and electrodes $E_1$ and $E_2$.

In these circumstances, in the case in which a low percentage $\phi_2$ of the signal is taken off, the arrangement in accordance with the invention can be used for detecting the presence of the signal, when the signal $\phi_1$ itself is being transported by the waveguide $G_1$ to a signal procession arrangement not shown and not described here as it does not form a part of the invention. This in this case the arrangement in accordance with the invention provides two optical channels suitable for use; the first channel conveying the main signal $\phi_1$. into the waveguide $G_1$ which is called the main guide from now on and the second channel conveying a portion $\phi_2$ of the signal for detection.

In contradistinction thereto, in the case in which the whole signal $\phi_1$ is taken off by the detector, the function of the arrangement in accordance with the invention is the same as that of the arrangement known from the state of the art.

However, in both cases, that is to say in the case of one channel or in the case of two channels, the arrangement in accordance with the invention offers considerable advantages over the known arrangement which have already been observed:

the wave guide and the detector are deposited on the same surface of the substrate;

the light does not pass through the substrate;

the light is always guided.

Figure 2A:
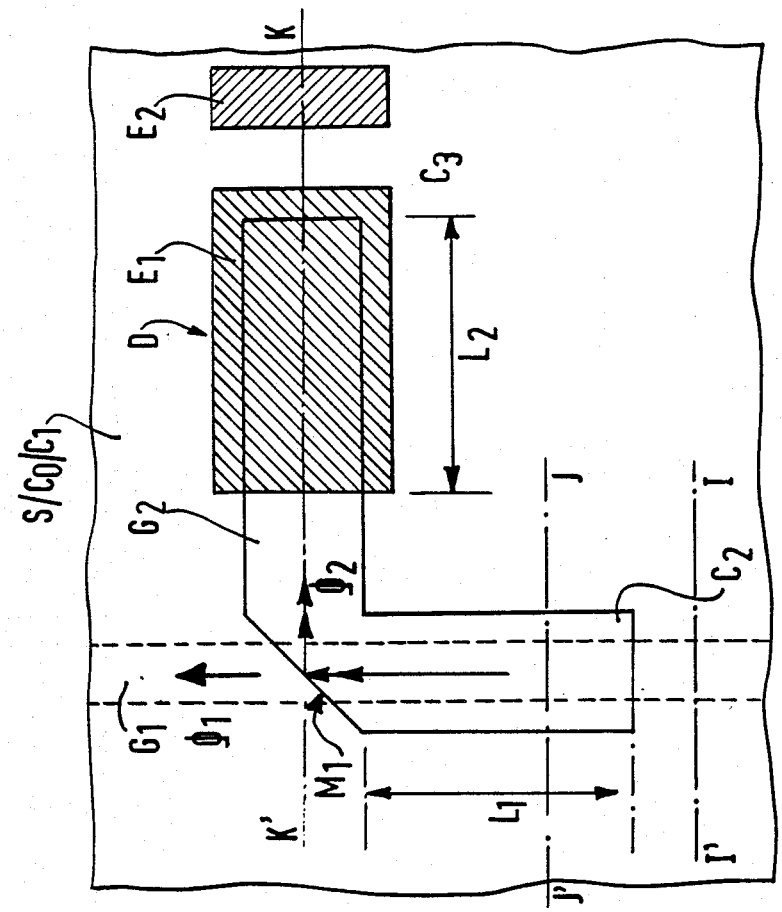
FIG. 2a shows in a diagram an arrangement in accordance with the invention coupled to a light waveguide by means of an intermediate guide, viewed from above.

As schematically shown in FIG. 2a, viewed from above, in a variant of the invention, the coupling arrangement is connected on the one hand to a waveguide $G_2$, referred to as intermediate guide, and on the other hand to a photodetector D. The intermediate waveguide $G_2$ itself is connected in parallel with its axis over a length of $L_1$, referred to as the coupling length, to the main guide $G_1$ which conveys a signal in a range of wavelengths selected to be, for example, approximately:

$$\lambda_1 \approx 1.3 \ \mu m$$

or $$\lambda_2 \approx 1.55 \ \mu m$$

corresponding to the standards used in telecommunication.

FIG. 2b is a cross-section along axis I-I' of the arrangement shown in FIG. 2a. In this region the arrangement comprises layers which have the same characteristics as those shown in FIG. 1b.

FIG. 2c is a cross-section along axis J-J' of the arrangement shown in FIG. 2a. As schematically shown in FIG. 2c, this arrangement comprises, deposited on top of the layer $C_1$, a layer $C_2$ of a group III-V semiconductor material having a crystalline mesh compatible with the preceding layers and having the refraction index of:

$$n_2 > n_1 > n_0.$$

In this layer $C_2$ the waveguide $G_2$ referred to as intermediate guide is formed, for example by means of the deposition process described hereinafter. For this purpose the material forming the $C_2$ layer is selected from the transparent compounds in the chosen operating range of wavelengths.

FIG. 2d shows a cross-section along axis K-K' of the arrangement of FIG. 2a. As schematically shown in FIG. 2d, this arrangement furthermore comprises a layer $C_3$ deposited on top of the $C_2$ layer, of a group III-V semiconductor compound, compatible with the preceding layers, and having the refraction index of:

$$n_3 > n_2 > n_1 > n_0.$$

In this cap layer $C_3$ is formed the photodetector D as it was called previously. The material forming the $C_3$ layer is thus chosen from the absorbing compounds in the chosen range of wavelengths. The photodetector deposited on top of layer $C_3$ is deposited on the surface of the intermediate waveguide $G_2$ and is coupled to the latter in parallel with its axis over a coupling length of $L_2$.

Allowing for the different indices of the materials comprised in this arrangement, a signal $\phi_1$ injected into the main guide $G_1$, will enter the intermediate guide $G_2$ for a part which is a function of the coupling length $L_1$. The percentage of the signal $\phi_2$ received by the intermediate guide $G_2$ may vary from a few to practically a hundred per cent.

However, the main interest of this variant of the arrangement in accordance with the invention lies in the possibility that only a small part $\phi_2$ of the signal $\phi_1$ can be taken off, this part $\phi_2$ being carried by the intermediate guide $G_2$ in the direction of the photodetector, and the coupling length $L_2$ between the photodetector D and the intermediate $G_2$ being chosen such that the whole of signal $\phi_2$ passes through the photodetector.

This variant is particularly interesting for carrying the portion $\phi_2$ of the signal $\phi_1$ into a zone of the substrate which is remote from the main guide $G_1$, and in which the photodetector D is formed. The arrangement in accordance with the invention thus offers the advantage over the arrangement known from the state of the art and in addition to the advantages stated before, that the signal $\phi_1$ remains usable for the purpose it was originally meant for, generally for the transmission of coded information.

For this purpose, as stated before, the intermediate guide $G_2$ is first coupled to the main guide $G_1$ over a length of $L_1$ as shown in FIG. 2a. However, this intermediate guide $G_1$ contains a reflecting facet $M_1$ at the end of the coupling length $L_1$ for reflecting the light beam $\phi_2$ to the photodetector D into a direction differing from the axial direction of the main guide $G_1$.

The intermediate guide $G_2$ can optionally contain various reflecting facets for reflecting the light beam $\phi_2$ along a complex path to the photodetector D.

As shown in the cross-section of FIG. 2d, a layer $C_4$ is deposited on top of the absorbing layer $C_3$ for forming the photodetector D, in order to form with this absorbing layer $C_3$ a junction p-n and these layers contain electrodes $E_1$ and $E_2$.

In order to improve the efficiency of the arrangement formed by coupling the intermediate guide $G_2$ and the photodetector D, in this variant of the invention, the intermediate guide $G_2$ can contain at its end a reflecting facet $M_2$ reflecting the flux $\phi_2$ in the direction of the absorbing layer $C_3$.

In an embodiment of the invention and its variant, the substrate S is an $A_{III}$-$B_V$ binary compound in which A is the indium (In) element and B is the phosphorus (P) element forming the indium phosphide (InP). This substrate can be rendered semi-isolating with Fe ion doping.

Figure 3A:
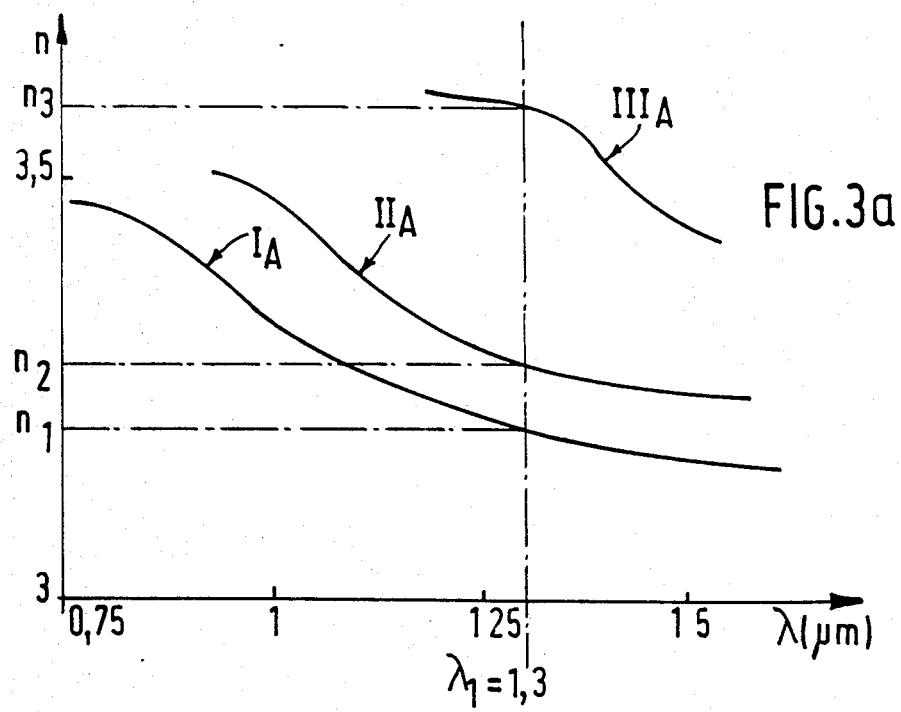
FIG. 3a shows the variations as a function of the wavelength $\lambda$, of the respective refraction indices $n_1$, $n_2$, $n_3$ of the binary compound $InP-n^-$ (curve $I_A$), the quaternary compound $Ga_xIn_{1-x}, As_yP_{1-y}$ in which $y \simeq 0.2$ (curve $II_A$) and the quaternary compound $Ga_xI_{1-x}, A_{xy}P_{1-y}$ in which $y \simeq 0.7$ (curve $III_A$)
Figure 3B:
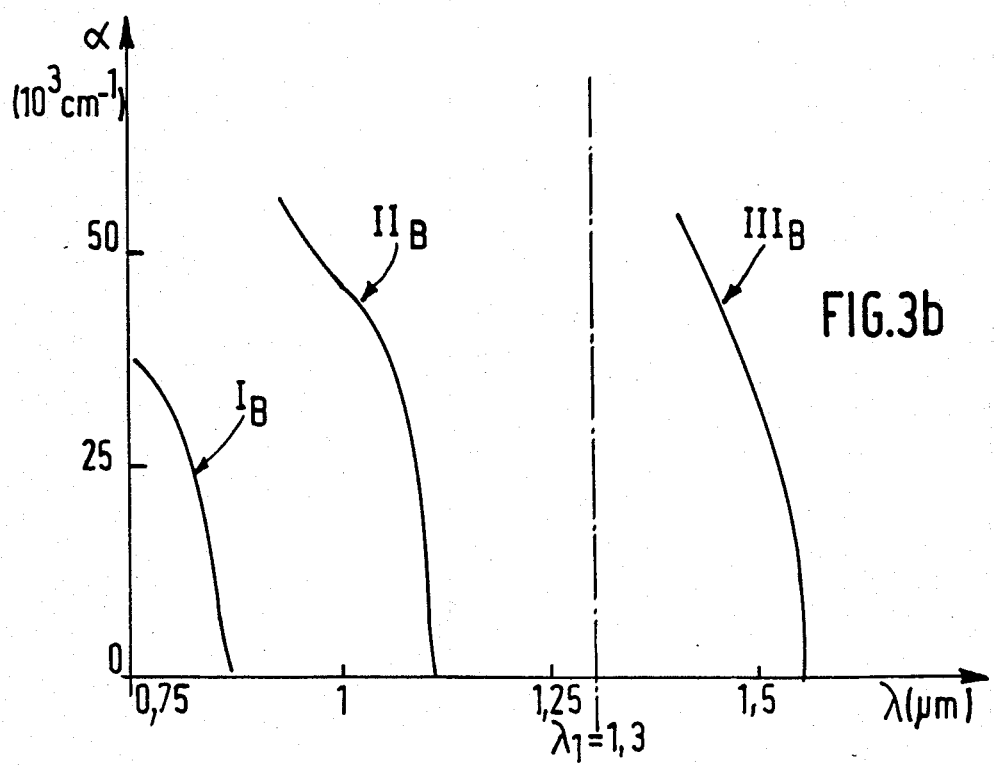
FIG. 3b shows the variations as a function of the wavelength $\simeq$, of the absorption coefficients $\alpha$ of the binary compound $InP-n^-$ (curve $I_B$), the quaternary compound $(Ga_xIn_{1-x}, As_yP_{1-y})$ in which $y \simeq 0.2$ (curve $II_B$) and the quaternary compound $(Ga_xIn_{1-x}, As_yP_{1-y})$ in which $y \simeq 0.7$ (curve $III_B$)

In this embodiment the confining layer $C_0$ is an $A_{III}$-$B_V n^+$compound which can be indium phosphide (InP) containing some $10^{18}$ impurities per $cm^3$, and the layer $C_1$ forming the main waveguide $G_1$ is an $A_{III}$-$B_V$ n⁻ compound which can be indium phosphide (InP) intentionally non-doped. Thus this material is transparent for the wavelength of:

$$\lambda_1 \simeq 1.3 \, \mu m$$

as shown by the curve $I_B$ of the FIG. 3b giving the absorption coefficients $\alpha$ as a function of the wavelength $\lambda$. On the other hand, this material has the refraction index shown in FIG. 3a by the curve $I_A$, as a function of the wavelength $\lambda$ of a value $n_1$ for the wavelength of $$\lambda_1 \simeq 1.3 \, \mu m.$$

The material forming the absorbing layer $C_3$ can advantageously be a ternary ($A_{III} X_{III}, Y_V$) compound in which A is indium (In), X is gallium (Ga) and Y is arsenic (As), that is to say GaInAs. This material can equally advantageously be composed of quaternary compounds of the formula ($A_{III} X_{III}, B_V Y_V$) in which A is indium (In), X is gallium (Ga), Y is arsenic (As) and B is phosphorus (P), and the compound ($Ga_x In_{1-x}, As_y P_{1-y}$) in which the concentration y is of the order of 0.7 or over. Actually, the curve $III_A$ of FIG. 3a showing the variations of the refraction index of this quaternary compound as a function of the wavelength, shows that at $\lambda_1 = 1.3 \, \mu m$ this index $n_3$ is sufficiently higher then the index nl of the waveguide $G_1$. On the other hand, the curve $III_B$ of the FIG. 3b showing the absorption coefficient $\alpha$ of this compound as a function of the wavelength, shows that at $\lambda_1 = 1.3 \, \mu m$ this compound has an absorption which is sufficiently important for the detecting function to be realized.

Furthermore, from the curves of FIGS. 3a and 3b it can be deduced that the refraction index of the ternary GaInAs compound will be higher than the index of the quaternary compound $Ga_x In_{1-x} As_y P_{1-y}$, in which $y > 0.7$, and that the absorption of the said ternary compound will be higher than the absorption of the said quaternary compound. It can also be deduced that the quaternary compounds of the formula $Ga_x In_{1-x} As_y P_{1-y}$ in which $0.7 < y \leq 1$ will produce indices and absorption coefficients having values between those corresponding to the said ternary compound and the said quaternary compound. This allows defining a set of compounds which can be advantageously used for forming the absorbing layer $C_3$ meant for constituting the detector D.

The material which the transparent layer $C_2$ is composed of, for forming the intermediate guide $G_2$, can advantageously be a quaternary compound ($A_{III} X_{III}, B_V Y_V$) in which A is indium (In), X is gallium (Ga), Y is arsenic (As) and B is phosphorus (P) having the composition ($Ga_x In_{1-x}, As_y P_{1-y}$) in which the concentration y is of the order of 0.2. Actually, the curve $II_A$ of FIG. 3a representing the variations of the refraction index of this quaternary compound shows that for the wavelength of $\lambda_1 = 1.3 \, \mu m$ its refraction index $n_2$ is such that:

$$n_1 < n_2 < n_3.$$

On the other hand, the curve $II_B$ of FIG. 3b representing the variations of the absorption coefficient of this quaternary compound, shows that it is transparent for the wavelength of $\lambda_1 = 1.3 \, \mu m$.

From the curves of FIGS. 3a and 3b it can furthermore be deduced that other quaternary compounds can be chosen for forming the transparent layer $C_2$ when choosing $Y \neq 0.2$, but such that the relationship $$n_1 < n_2 < n_3$$

is obtained for the indices, and that the absorption coefficient corresponds to a transparent domain for the operating wavelength. The following relationship can, for example, be obtained $0.1 \leq y < 0.7$. Finally, if the other wavelength standard $\lambda_2 = 1.55 \, \mu m$ has to be used, the curves of FIG. 3 allow of selecting the compounds of a formula adapted to the said requirements for forming the layers $C_1$, $C_2$, $C_3$.

The layer $C_4$ intended to form a junction p-n with the layer $C_3$ for constituting the photodetector D, can be advantageously obtained by ion diffusion such as Zn or Cd in a zone of the $C_3$ layer on the surface of which an electrode is provided having contact $E_1$ by all means known from the state of the art, for example, with the aid of a multi-layer Ti—Pt—Au. The operation of the photodetector requires a second electrode $E_2$ which can be fabricated in a zone in which the layer $C_0$ is visible, which zone is, for example, cleared by etching off the cap layers and on which is deposited, for example, a multi-layer Au—Ge—Ni.

It is also possible to fabricate the arrangement in accordance with the invention directly on a substrate of the compound in accordance with the composition described for the confining layer $C_0$. In this case it is possible to deposit the second contact $E_2$ of the detector on the rear surface of the substrate.

FIRST EMBODIMENT OF THE INVENTION

In order to use this first application of the invention proposed by way of example, the arrangement for either one of the two variants is used in accordance with the invention, only in the cases when the coupling lengths are provided such that only a small part of the signal is received by the photodetector D, whilst the greater part of the signal continues to be propagated into the waveguide $G_1$.

Figure 4A:
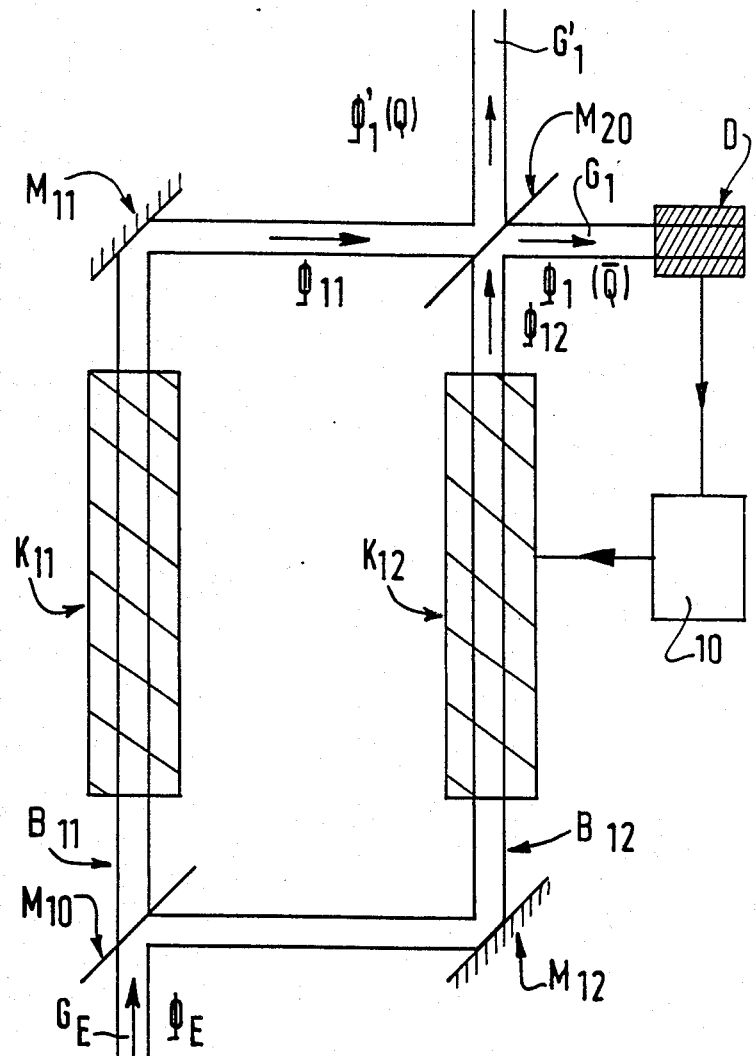
FIG. 4a shows an integrated interferometer of the Mach-Zehnder type comprising an arrangement in accordance with the invention.

This first use of the invention is shown in FIG. 4a. This FIG. 4a shows an interferometer of the Mach-Zehnder type which is completely and monolithically integrated on a single crystalline semiconductor S substrate, according to a technique described in the European Patent Specification 0 179 507. This interferometer comprises a light waveguide $G_E$ into which is injected a monochromatic light signal $\phi_E$ having a wavelength of, for example, $\lambda_1 = 1.33 \, \mu m$.

This light beam $\phi_E$ meets a semi-reflecting plate $M_{10}$ dividing the light beam $\phi_E$ into two beams of equal amplitude $\phi_{11}$ and $\phi_{12}$. Before the beams $\phi_{11}$ and $\phi_{12}$ are recombined by the semi-reflecting plate $M_{20}$ the optical distance covered by $\phi_{11}$ and $\phi_{12}$ in the branches $B_{11}$ and $B_{12}$ is the same. These paths in the branches $B_{11}$ and $B_{12}$ are subject to the reflection from a totally reflecting mirror $M_{11}$ and $M_{12}$, respectively, but also to the effect of an electric field running through one of the two electrodes $K_{11}$ or $K_{12}$, whilst a potential difference is applied for this purpose between one of these electrodes, for example $K_{12}$, and an earth electrode for example chosen on the substrate, and the other electrode, for example $K_{11}$, is only fabricated for symmetrising the arrangement and is thus connected to earth.

Figure 4B:
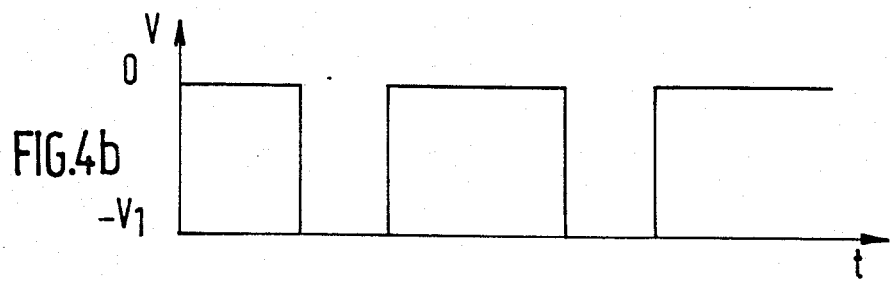
FIGS. 4b to 4f show the signal sequence in this interferometer either as voltage variations or current variations.
Figure 4C:
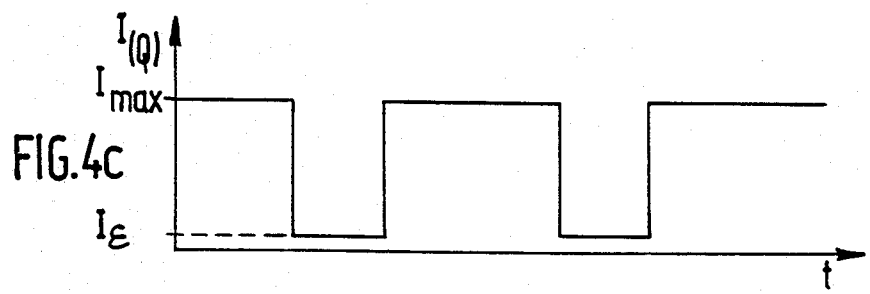

FIG. 4b shows the variations of the voltage $V_1$ applied to electrode $K_{12}$ as a function of time t. The FIG. 4c shows the variations of the optical intensity $I_{(Q)}$ as a function of time, which are induced by the variations of the voltage $V_1$.

Figure 4D:
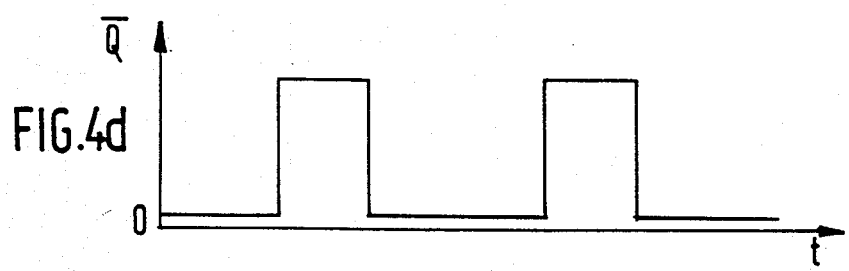
Figure 4E:
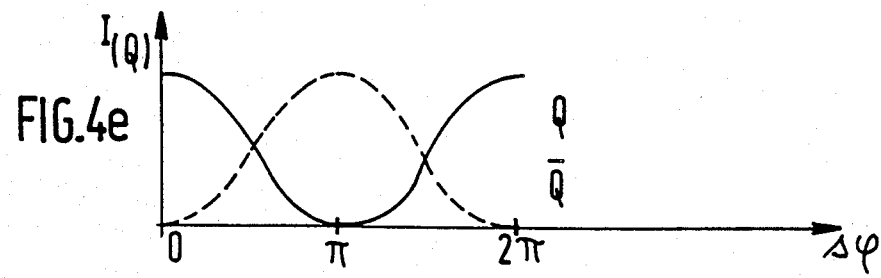

FIG. 4d shows the form of signal $\overline{Q}$ encoding the light beam $\phi_1$ in the output branch $G_1$, whilst the signal $\overline{Q}$ is the complementary of the signal Q encoding the light beam $\phi_1$ in the output branch $G'_1$. The FIG. 4e shows the variations of the optical intensity $I_{(Q)}$ of the signals Q and $\overline{Q}$ in the output branches $G_1$ and $G'_1$ as a function of the phase shift $\Delta\phi$. Finally, FIG. 4f shows the variations of the absorption coefficient $$T_E = \frac{I_{max}}{I_E} = \frac{I_{(Q)}}{I_{(Q)}}$$

as a function of the phase shift error $\delta\phi$ between $I_Q$ and $I_{\overline{Q}}$.

Figure 4F:
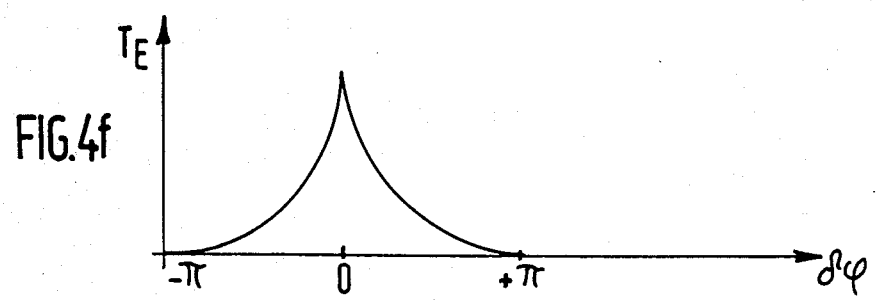

The comparison of the FIGS. 4e and 4f shows that if a slight supplementary phase shift $\delta\phi$ appears between $I_Q$ and $I_{\overline{Q}}$ which theoretically should have opposite phases, the absorption coefficient $T_E$ will decrease very rapidly and in fact it will no longer be possible to have extinction. This may be due to the fact that the electrode $K_{11}$ or $K_{12}$, for example, derives bias voltages as a function of temperature variations.

When inserting an arrangement in accordance with the invention in one of the output branches of the interferometer, it can be detected whether there is non-extinction, or, in a simpler manner, whether a maximum cannot be reached and an arrangement 10(not shown) can be operated for correcting the value of the voltage(s) on the electrode(s) $k_{11}$ (and $K_{12}$).

SECOND EMBODIMENT OF THE INVENTION

A bistable optical arrangement is known from the state of the art, from the publication by Alain CARENCO in EIE (21, rue d'Assas, Paris), comprising two light conductors integrated on a semiconductor substrate and sideways coupled by means of electrodes and also comprising a signal detector which is not integrated.

An improvement of this bistable arrangement can be obtained when fabricating the detector in accordance with the invention.

THIRD EMBODIMENT OF THE INVENTION

The arrangement in accordance with the invention can be used in the case when the coupling lengths are provided such as to let the whole input signal be received by the detector, for taking demultiplexed signals from the waveguide output.

Figure 5:
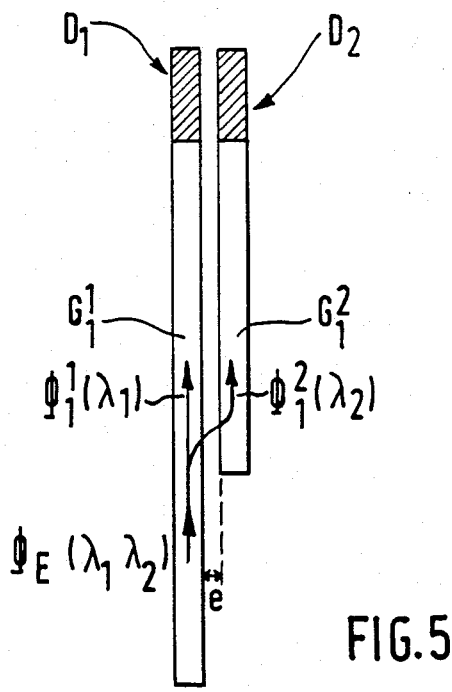
FIG. 5 shows an integrated demultiplexer arrangement comprising arrangements in accordance with the invention.

This application is explained with reference to FIG. 5. This FIG. 5 shows, viewed from above, monolithically integrated on a semiconductor substrate, two or several guides $G_1^1$, $G_1^2$ etc. each conveying monochromatic light beams of the respective wavelength of $\lambda_1$, $\lambda_2$ etc.

These light beams can originate from a single guide of input $G_E$ thus conveying a multiplexed signal $\phi_E$ which can be demultiplexed by the mere fact that the signals having the wavelengths of $\lambda_1$, $\lambda_2$ etc. selectively pass through the respective guides $G_1^1$, $G_1^2$, by coupling, simply because the refraction index of the guides $G_1^1$, $G_1^2$ has exactly been planned for enhancing the propagation at these wavelengths.

As a result of the integration on the one hand and the selective coupling on the other, the guides $G_1^1$, $G_1^2$ are deposited close together on the substrate. The photodetectors $D_1, D_2$ etc. placed on the guides $G_1^1$, $G_1^2$ in accordance with the invention, allow detection of the respective transported signals without the risk of renewed multiplexing.

This result could not have been achieved by means of the arrangement known from the state of the art, because a renewed multiplexing of the signals would occur, whilst passing through the substrate, between the guides and the detectors simply because the signals are no longer guided when passing through the substrate.

MANUFACTURING PROCESS OF THE ARRANGEMENT IN ACCORDANCE WITH THE INVENTION

An advantageous manufacturing process of the invention is described hereinafter completely by way of example.

This process starts the vapor-phase epitaxial growth (VPE) or the liquid-phase epitaxial growth (LPE), the former being given preference, however.

The first layer $C_0$, the confining layer, is deposited on a single crystal oriented substrate S. Subsequently, a groove 1 is made in the layer $C_0$ by means of anisotropic etching such that this groove has longitudinal sides formed by crystal facets (FIGS. 1b and 2b).

Then, layer $C_1$ is deposited on top of layer $C_0$, preferably by means of VPE growth. Actually, the rate of growth in the long sides of the groove can be higher with this process than the rate of growth on the top surface of layer $C_0$. Therefore, owing to the VPE growth the top surface of the layer $C_1$ becomes one of the PLANAR type. Such a result could be achieved with more difficulty with the types of growth called MOVPE or MBE which most frequently form layers of a uniform thickness, whilst they do not allow getting a PLANAR structure on a groove. The grooves thus filled by the layer $C_1$ form the guides $G_1$.

Then in the opening of the appropriate masks the guides $G_2$ are fabricated by means of localized epitaxial growth. The guides $G_2$ grow in the form of strips, raised on the layer C, and have longitudinal faces formed by cyrstallographic facets. With this method it is also possible to fabricate in the same way mirrors $M_1$ formed by crystallographic facets.

Finally in the opening of the appropriate masks the detectors D are fabricated by means of localized epitaxial growth, raised on the guides $G_1$ or $G_2$, and have terminal and longitudinal faces formed by crystallographic facets. With this method it is possible to fabricate in the same way mirrors $M_2$ formed by crystallographic facets.

The layers $C_4$ and the electrodes $E_1$ and $E_2$ are manufactured in a manner known from the state of the art.

With this manufacturing process including the anisotropic etching and localised epitaxy, the light is particularly well confined in the guides and in the detectors and the losses are kept as low as possible, whilst these losses are diminished with respect to the arrangement from the state of the art by the mere fact that the light is always guided.

Figure 6A:
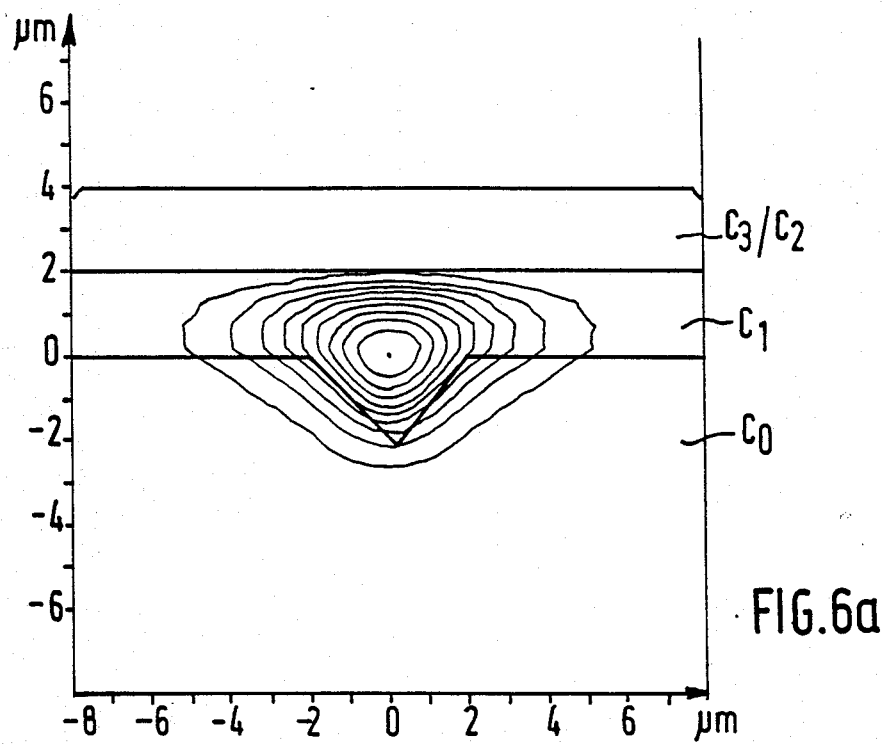
FIGS. 6a and 6b show the curves of equal intensity in sections of the arrangement according to the invention corresponding with FIG. 1c or 2c, respectively, at the very beginning of the coupling and after a certain coupling distance.
Figure 6B:
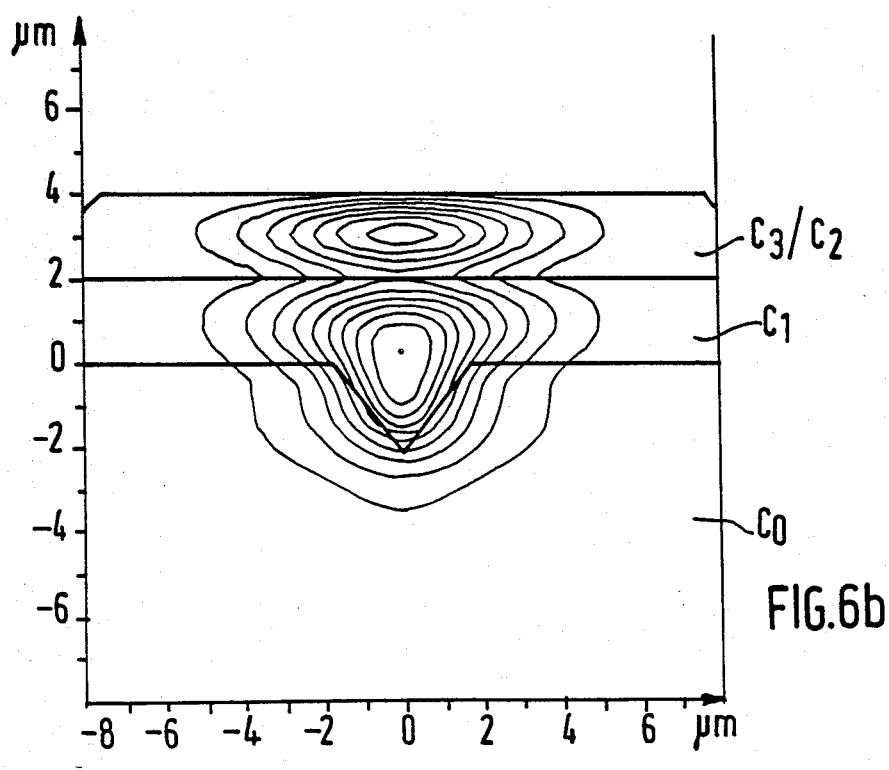

FIGS. 6a and 6b show the propagation of the light in the arrangement in accordance with the invention.

FIG. 6b shows the curves of equal intensity in the arrangement shown in section in FIG. 1c or 2c at the very beginning of the coupling, enabling the reader to judge the localisation of the light in the guide $G_1$.

FIG. 6b shows the curves of equal intensity in the arrangement shown in section in FIGS. 1c or 2c after a certain coupling distance and they allow the reader to judge the localisation of the light which passes the coupling of the guide $G_1$ in the detector D or in the guide $G_2$.

Furthermore, it should be noted that the arrangement in accordance with the invention can also be fabricated by means of a process causing non-localised epitaxial growth, followed by selecting etching in the mask openings of the appropriate form. Such a technique has so far been classical for those skilled in the art.

Finally, in this last manufacturing process, if the substrates of a compound identical to the one which is recommended for the confining layer $C_0$, the arrangement according to FIG. 1 can be realized in a single epitaxial step.

What is claimed is:

1. An integrated semiconductor device of the type for coupling between a photodetector D and a light waveguide $G_1$, operating within a band of given wavelengths, containing on the surface of a semiconductor substrate S of a III-V compound a confining layer $C_0$ of a III-V compound and a transparent layer $C_1$ of a III-V compound, transparent layer $C_1$ being transparent for the operating wavelengths and having an index superior to that of the confining layer, the light waveguide $G_1$ being disposed in layer $C_1$, and also containing an absorbing layer $C_3$ of a III-V compound, for the operating wavelengths, having an index superior to that of the waveguide, in which later $C_3$ the photodetector is formed, characterized in that the absorbing layer $C_3$ is deposited on top of the transparent layer $C_1$ such that the photodetector is formed on the surface of the light waveguide $G_1$ and coupled to said waveguide $G_1$ in parallel with the axis of $G_1$ over a given coupling length $L_2$ which is a function of the amount of light issued by the waveguide $G_1$ and received by the photodetector.

2. A device as claimed in claim 1, characterized in that said device comprises, deposited between the transparent layer $C_1$, hereinafter called first transparent layer, and the absorbing layer $C_3$, a second transparent layer $C_2$ of a III-V compound for the operating wavelengths having an index lying between that of the first transparent layer $C_1$ and that of the absorbing layer $C_3$, in which second transparent layer $C_2$ a second light waveguide $G_2$ referred to as an intermediated guide is realised, formed on the surface of the guide deposited in the first transparent layer $C_1$, hereinafter called main guide $G_1$, and coupled to the latter in parallel with the axis of $G_1$ over a coupling length $L_1$ which is a function of the amount of light issued by the main guide $G_1$ and received by the intermediate guide $G_2$.

3. A device as claimed in one of the claims 1 or 2, characterized in that the substrate S is an $A_{III}B_V$ compound in which A is, for example, the indium element (In) and B is, for example, the phosphorus element (P) in that the confining layer is an $A_{III}B_V$ compound of the $n^+$ conductivity type, in that the first transparent layer $C_1$ is of the $A_{III}B_V$ compound of the $n^-$ conductivity type, and in that the absorbing layer $C_3$ is an $(A_{III}X_{III}, B_VY_V)$ compound in which A is, for example, the indium element (In), X is, for example, the gallium element (Ga), B is, for example, the phosphorus element (P) and Y is, for example, the arsenic element (As), thus forming a quaternary compound of the formula $(GaInAs_yP_{1-y})$ in which the concentration y is chosen for obtaining the absorbing characteristics of the compound at the chosen operating wavelength.

4. A device as claimed in claim 3, characterized in that for the chosen operating wavelength $\lambda_1 = 1.3$ $\mu$m, the concentration y is bounded by the relationship $0.7 \leq y < 1$.

5. A device as claimed in claim 2 characterized in that the second transparent layer $C_1$ is of an $(A_{III}X_{III}, B_VY_V)$ compound in which for example A is indium (In), X is gallium (Ga), B is phosphorus (P) and Y is arsenic (As), thus forming a quaternary compound of the formula $(GaIn, As_yP_{1-y})$ in which the concentration y is chosen for obtaining transparency characteristics for the chosen operating wavelength.

6. A device as claimed in claim 5, characterized in that for the chosen operating wavelength of $\lambda_1 = 1.3$ $\mu$m, the concentration y is bounded by the relationship $0.1 \leq y < 0.7$.

7. A device as claimed in claim 1, characterized in that the longitudinal faces of the guides $G_1$ and $G_2$, as well as the faces of the detector are limited by crystallographic faces.

8. A device as claimed in claim 1, characterized in that the intermediate guide $G_2$ contains a reflecting facet $M_1$ at the end of the coupling length $L_1$ for reflecting the light in the direction of the photodetector which is positioned remote from guide $G_1$.

9. A device as claimed in claim 8, characterized in that the reflecting facet $M_1$ is a crystallographic facet.

10. A device as claimed in claim 2, characterized in that the intermediate guide $G_2$ contains a reflecting facet $M_2$ at the end of the coupling length $L_2$ for reflecting the light in the direction of the absorbing layer $C_3$ of the photodetector D.

11. A device as claimed in claim 10, characterized in that the reflecting facet $M_2$ is a crystallographic facet.

* * * * *